UNITED STATES PATENT OFFICE.

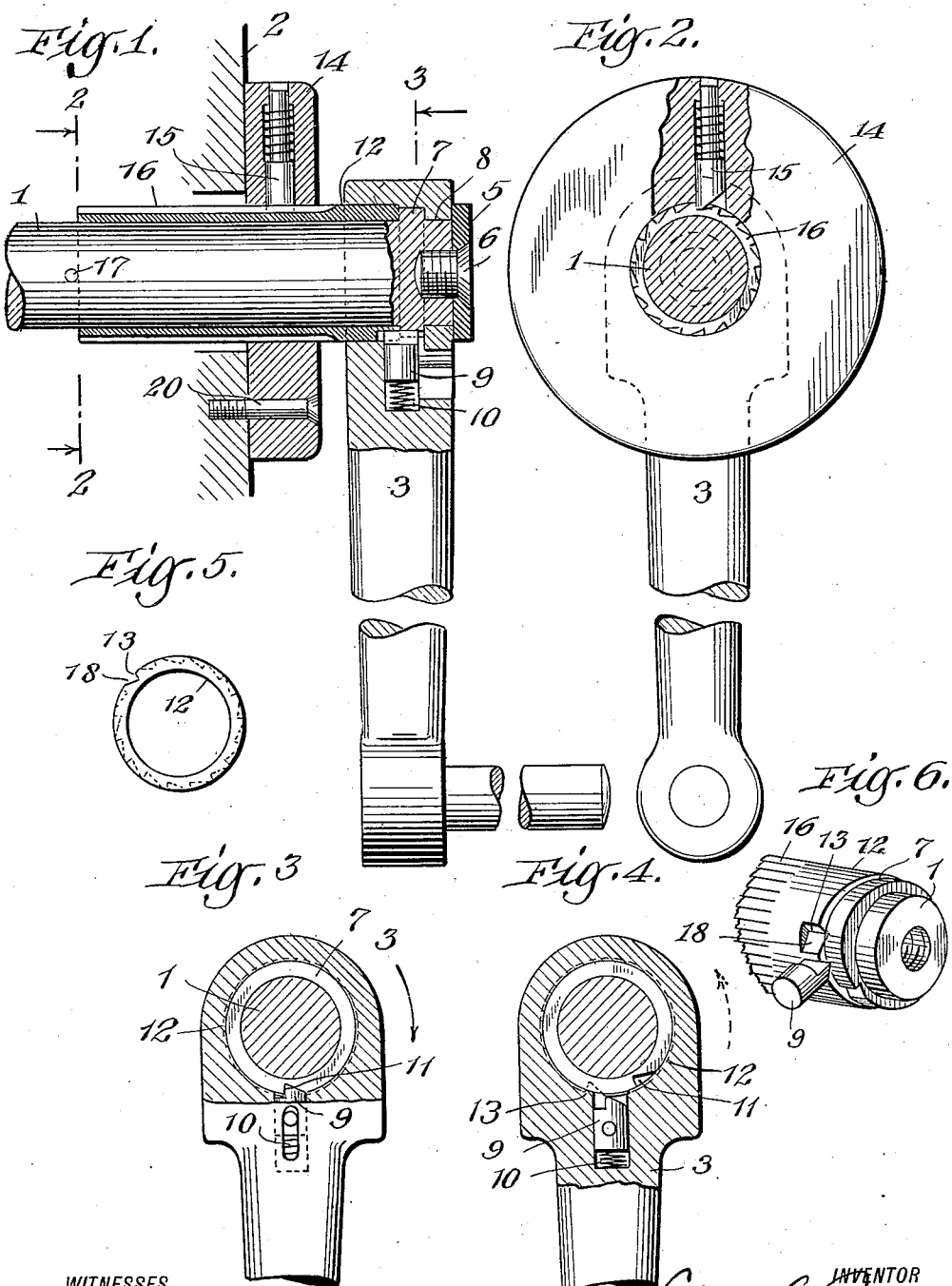

EDWARD A. FEIRING, OF PLAINFIELD, NEW JERSEY.

CRANKING DEVICE FOR AUTOMOBILES AND OTHER MACHINERY.

1,007,654.  Specification of Letters Patent. Patented Oct. 31, 1911.

Application filed November 18, 1910. Serial No. 593,033.

*To all whom it may concern:*

Be it known that I, EDWARD A. FEIRING, a citizen of the United States of America, residing at Plainfield, county of Union, and State of New Jersey, have invented certain new and useful Improvements in Cranking Devices for automobiles and other Machinery, of which the following is a specification.

The present invention relates to a cranking device for the engines of motor vehicles and for other machinery such as car brakes and the like.

The invention is particularly adapted for use in connection with the crank shaft of any engine or power storing machinery which must at times be operated from a crank shaft, but which is liable at such times to exert back pressure on the shaft and reverse the same while the hand is on the crank.

It is well known that the cranking of an automobile engine, preliminary to the starting of the machine, often results in serious injury to the operator when the engine reverses due to the ignition and expansion of the charge in the cylinder, before the compression of the charge is completed, and while the operator's hand is on the crank. Similarly the release of a car brake often causes the brake crank to be revolved with such violence and power as to endanger persons within reach of the same.

The principal object of the present invention is to provide a means for automatically disconnecting or releasing the crank from the crank shaft, whenever the shaft is reversed by the engine or other machinery to which it is connected, so that the crank may remain stationary in the operator's hand while the reversing movement of the shaft takes place. In the present invention, the crank cannot be reversed by the crank shaft. The means for releasing the crank from the crank shaft is operated by the shaft itself as soon as the latter commences to reverse, and the releasing action is therefore automatic and always correctly timed.

Other features of the invention will presently and more fully appear in connection with the accompanying drawings in which—

Figure 1 is a view in cross section through the assembled cranking mechanism. Fig. 2 is a view of the assembled mechanism, taken on the line 2—2 of Fig. 1, the same being partly broken to show more clearly certain details of the structure. Fig. 3 is a view in cross section on the line 3—3 of Fig. 1, the crank being locked to the crank shaft. Fig. 4 is a view similar to Fig. 3 except that the crank is released from the crank shaft and is broken away to a greater degree to show the locking pawl. Fig. 5 is an end view of the ratchet sleeve which serves to release the crank from the crank shaft when the latter is reversed. Fig. 6 is a perspective view showing the ratchet sleeve of Fig. 5 mounted on the crank shaft and the locking pawl held by the ratchet sleeve out of engagement with the crank shaft to permit of free backward rotation of the shaft.

Referring to the drawings, the crank shaft 1 is shown as mounted in a suitable bearing block 2 to have rotary movement. The shaft in addition to being rotatable in its bearing, is also shiftable longitudinally in its bearing, so that it may be coupled and uncoupled in the usual manner from the engine. Loosely mounted on the end of the shaft 1 is the crank 3. The crank 3 is held against longitudinal displacement on the shaft by means of a washer 5 secured by a screw 6 to the end of the shaft and by means of an annular enlargement of the shaft 7 between which and the washer 5, the annular flange 8 on the crank is held. Within the arm of the crank 3 is a pawl 9 which is held by a compression spring 10 against the annular enlargement 7 of the shaft. In the annular portion 7 of the shaft is a ratchet tooth or recess 11 with which, when the crank is turned to crank the engine, the pawl 9 rotates so that the crank shaft and crank may be turned together. When the direction of the movement of the crank 3 is released, the pawl 9 rides up out of engagement with the ratchet tooth 11 so that the crank may turn independently of the shaft.

Loosely mounted on the shaft 1 is a sleeve 12, the purpose of which is to release the crank from the crank shaft in event the direction of movement of the shaft is reversed by the engine during the cranking operation. For this purpose, the sleeve 12 has at its outer end, a ratchet tooth 13 (see Fig. 5) similar to the tooth 11 on the annular enlargement 7 of the crank shaft. The pawl 9 (see Figs. 1 and 6) is of sufficient width to engage simultaneously the tooth 13 on the sleeve 12 and the tooth 11 on the enlargement 7 of the shaft. The sleeve 12 is of slightly greater diameter than the diameter of the annular enlargement 7 of the shaft. Assuming, therefore, that the crank is in such position that the pawl 9 is not in engagement with either of the teeth 11 or 13, it must be bearing upon the sleeve 12 and by the latter held out of engagement with the annular portion 7 of the shaft (see Figs. 4 and 6). If, with the parts in this position, the crank is turned in the direction to crank the shaft, the pawl 9 on rotating with the crank 3 first engages the tooth 13 on the sleeve 12, and the sleeve 12 being loose on the shaft is carried by the crank until the pawl reaches the tooth 11 on the crank, and thereafter the sleeve and the crank shaft are turned together by means of the pawl.

The sleeve 12 is intended to be moved in one direction only and cannot have its direction of rotation reversed by any reversing action of the engine on the shaft 1. For preventing reversal of the sleeve 12, there is carried in a plate 14 fast to the bearing block 2, by means of screws 20 or the like, a spring pawl 15, which coöperates with ratchet teeth 16 on the sleeve. The ratchet teeth 16 are so cut that when the sleeve is revolved with the crank by means of the pawl 9, the teeth 16 pass freely by the pawl 15, the latter merely riding over the same. The pawl 15, by engagement with the teeth 16, positively locks the sleeve against reversal. The teeth 16 are shown as elongated so that the sleeve may be shifted longitudinally with the shaft, when the latter is moved into and out of connection with the engine, while maintaining the pawl 15 in proper relation with the teeth on the sleeve. The sleeve is prevented from longitudinal movement on the shaft by reason of its bearing at one end, (as shown in Fig. 1), against the annular enlargement 7 on the shaft and by reason of a pin 17 carried by the shaft at the other end of the sleeve. The pin 17 by engagement with the bearing block 2 may also serve to limit the longitudinal shift of the shaft with the sleeve in one direction while the outer face of the block 14 by engagement with the crank handle may limit the shift of the shaft and sleeve in the other direction.

The action of the sleeve 12 in releasing the crank from the crank shaft in event of reversal of the latter by the engine is as follows. The sleeve 12 being loose on the shaft 1 is held stationary by the pawl 15 when the shaft is reversed. The tooth 11 on the enlargement 7 of the shaft must, however, move with the shaft when the latter reverses and being in engagement with the pawl 9 starts to carry the latter and the crank 3 with it. The pawl 9 at the instant of reversal is, however, in engagement not only with the tooth 11 on the shaft but also with tooth 13 on the sleeve. The pawl 9 cannot, however, reverse the sleeve because of the pawl 15 and consequently when the tooth 11 starts back with the pawl 9 and crank, the pawl 9 rides up on the surface 18 of the tooth 13 on the sleeve until the pawl 9 is on the periphery of the sleeve 12. Since the diameter of the sleeve 12 is greater than that of the annular enlargement 7 on the shaft, the pawl 9 in climbing onto the periphery of the sleeve 12 is disengaged from the tooth 11 of the shaft and stands in the position shown in Fig. 4. The crank is, therefore, released from the shaft by the cam action of the surface 18 and the shaft may, thereafter, turn backward without moving the crank. The direct drive of the crank shaft may be presently resumed by turning the crank in the proper direction. In so doing, the pawl 9 first engages the tooth 13 on the sleeve 12. It does not, however, at once drop into its normal driving engagement with the tooth 13, but, on engaging the tooth 13, it rides for a while on the annular enlargement 7, carrying with it the sleeve 12, until the tooth 13 is brought into registration with the tooth 11. The spring 10 thereupon completes the throw of the pawl 9, and the shaft and sleeve 12 rotate together, the pawl 15 riding idly over the teeth 16 on the sleeve until the cranking is completed or until a reversal of the engine causes the shaft 1 to be rotated backward and the crank released as, heretofore, described.

A simple and effective embodiment of the invention has been shown and described. It is obvious, however, that the structure shown is susceptible of various modifications within the scope of the invention. In certain uses of the invention, as for instance where it is used in connection with a car brake, it may not be necessary or even desirable for the shaft to be shiftable longitudinally. The locking pawls instead of being of the design shown, may be pivoted on their supports at any suitable points, and any suitable throw off device for disengaging the crank from the shaft may be substituted for the cam 18, according to the particular design and arrangement of the pawl or latch which serves to lock the crank and the shaft. Other possible variations of one or more of the elements of the structure will be apparent to one skilled in the art.

I claim—

1. In a starting mechanism, a crank shaft, a crank loose on the shaft, a sleeve also loose on the shaft, said crank carrying a yieldable detent device in part adapted to bear upon the periphery of the shaft and in part adapted to bear upon the periphery of the sleeve, a shoulder on the shaft and a shoulder on the sleeve, each of said shoulders being adapted to be engaged by said detent device when the crank is turned in the proper direction to drive the shaft, and the sleeve being free to turn in said direction with the crank, said sleeve having also means for lifting said detent device out of engagement with the shoulder on the shaft when the crank is turned relatively to the sleeve in the other direction, and means for locking the sleeve against movement when the shaft reverses its drive and turns in such other direction.

2. In a starting mechanism, a crank shaft, a crank loose on the shaft, a sleeve also loose on the shaft, said crank carrying a yieldable detent device in part adapted to bear upon the periphery of the shaft and in part adapted to bear upon the periphery of the sleeve, a shoulder on the shaft and a shoulder on the sleeve, each of said shoulders being adapted to be engaged by said detent device when the crank is turned in the proper direction to drive the shaft, and the sleeve being free to turn in said direction with the crank, said sleeve having also a peripheral cam surface for lifting said detent device out of engagement with the shoulder on the shaft when the crank is turned relatively to the sleeve in the other direction, and means for locking the sleeve against movement when the shaft reverses its drive and turns in such other direction.

3. In a starting mechanism, a crank shaft, a crank loose on the shaft, a sleeve also loose on the shaft, said crank carrying a yieldable detent device in part adapted to bear upon the periphery of the shaft and in part adapted to bear upon the periphery of the sleeve, each of said shoulders being adapted to be engaged by said detent device when the crank is turned in the proper direction to drive the shaft, and the sleeve being free to turn in said direction with the crank, said sleeve having also a peripheral cam surface for lifting said detent device out of engagement with the shoulder on the shaft when the crank is turned relatively to the sleeve in the other direction, and being of greater diameter than the shaft to hold said detent out of engagement with the shaft during such reverse drive, and means for locking the sleeve against movement when the shaft reverses its drive and turns in such other direction.

4. In a starting mechanism, a crank shaft, a crank loose on the shaft, a yieldable detent device carried by the crank and adapted to bear in part upon the crank shaft, a shoulder on the shaft whereby the same may be engaged and driven by the detent when the crank is turned in one direction, a sleeve loose on the shaft and so positioned that the detent may bear in part upon the same, the sleeve having a recess therein to provide a shoulder engageable by the detent so that the sleeve may be turned by the crank when the latter is turned to drive the shaft, the sleeve having a bearing surface for the detent of sufficient diameter to hold the detent out of engagement with the shoulder on the shaft except when the detent drops into the recess in the sleeve, said sleeve having also a cam surface whereby when the crank and detent are moved relatively to the sleeve in the opposite direction, the detent will be lifted out of the recess and out of engagement with the crank, and means for holding the sleeve against rotation with the shaft when the direction of the rotation of the latter is reversed.

5. In a starting mechanism, a crank shaft having an annular enlargement, a sleeve loose on the shaft substantially abutting said annular enlargement and of substantially the diameter of said enlargement, a crank loose on the shaft and carrying a yieldable detent in part adapted to bear upon said shaft enlargement and in part adapted to bear upon the sleeve, a shoulder on said enlargement, and a shoulder upon the sleeve, each of said shoulders being adapted to be engaged by the detent whereby the sleeve and the shaft may be driven together in one direction by the crank, means for holding the sleeve against rotation when the drive of the shaft is reversed, and means on the sleeve for disengaging the detent from the shaft when the sleeve is held upon reversal of the shaft.

6. In a starting mechanism, a crank shaft having an annular enlargement, a sleeve on the shaft substantially abutting said enlargement and of substantially the diameter of said enlargement, a crank loose on the shaft and abutting the other side of said enlargement, means between which and said enlargement the crank is held against longitudinal displacement, a yieldable detent on said crank in part adapted to bear upon said shaft enlargement and in part adapted to bear upon the sleeve, a shoulder on said enlargement and a shoulder upon the sleeve, each of said shoulders being adapted to be engaged by the detent whereby the sleeve and the shaft may be driven together in one direction by the crank, means for holding the sleeve against rotation when the drive of the shaft is reversed, and means on the sleeve for disengaging the detent from the shaft when the sleeve is held upon reversal of the shaft.

Signed by me at New York, N. Y. this 16th day of November 1910.

EDWARD A. FEIRING.

Witnesses:
W. C. KING,
J. J. CARTY.